US011648476B2

(12) United States Patent
Guimaraes et al.

(10) Patent No.: US 11,648,476 B2
(45) Date of Patent: May 16, 2023

(54) METHOD FOR PROVIDING ASSISTED TRAVEL ALONG A COVER PATH IN A VIDEO GAME

(71) Applicant: SQUARE ENIX LIMITED, London (GB)

(72) Inventors: Rangner Ferraz Guimaraes, Verdun (CA); Rodrigo Barros Lima, Verdun (CA)

(73) Assignee: SQUARE ENIX LIMITED, London (GB)

(*) Notice: Subject to any disclaimer, the term of this patent is extended or adjusted under 35 U.S.C. 154(b) by 175 days.

(21) Appl. No.: 16/786,818

(22) Filed: Feb. 10, 2020

(65) Prior Publication Data
US 2020/0298122 A1    Sep. 24, 2020

(30) Foreign Application Priority Data

Mar. 21, 2019   (CA) .................................. CA 3037722

(51) Int. Cl.
*A63F 13/58*   (2014.01)
*A63F 13/537*  (2014.01)

(52) U.S. Cl.
CPC ............ *A63F 13/58* (2014.09); *A63F 13/537* (2014.09)

(58) Field of Classification Search
CPC ........ A63F 13/58; A63F 13/537; A63F 13/60; A63F 13/56
See application file for complete search history.

(56) References Cited

U.S. PATENT DOCUMENTS

| 2006/0094502 A1* | 5/2006 | Katayama | A63F 13/2145 463/31 |
| 2009/0311652 A1* | 12/2009 | Langridge | A63F 13/837 434/11 |
| 2018/0001201 A1* | 1/2018 | Desjardins | A63F 13/573 |

* cited by examiner

*Primary Examiner* — Thomas H Henry
(74) *Attorney, Agent, or Firm* — WTA Patents

(57) ABSTRACT

Various methods for implementation by a computer that executes a video game. A first method comprises obtaining a desired direction of motion of a playing character that is in cover mode and on a cover path; and moving the character along the cover path in case the desired direction of motion is within a given range of directions, the character being kept in cover mode. A second method comprises determining a distance of the character to a cover path associated with a particular game object; determining the character's angle of approach relative to the game object; and responsive to receipt of a command to invoke cover mode, causing the character to enter cover mode in case a plurality of conditions is satisfied including a first condition that depends on the distance of the character to the cover path and a second condition that depends on the character's angle of approach.

30 Claims, 10 Drawing Sheets

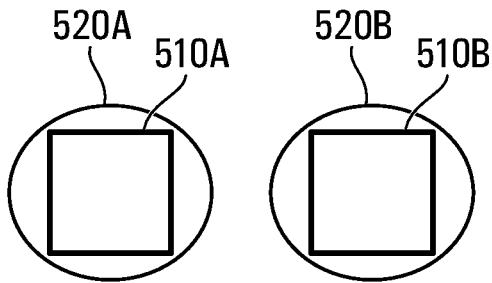
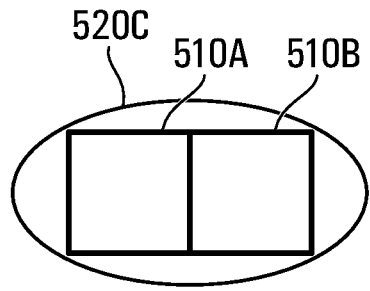
FIG. 5A                FIG. 5B
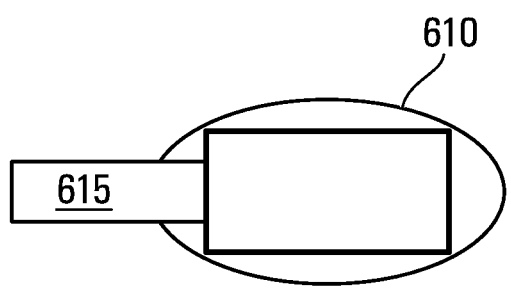
FIG. 6A
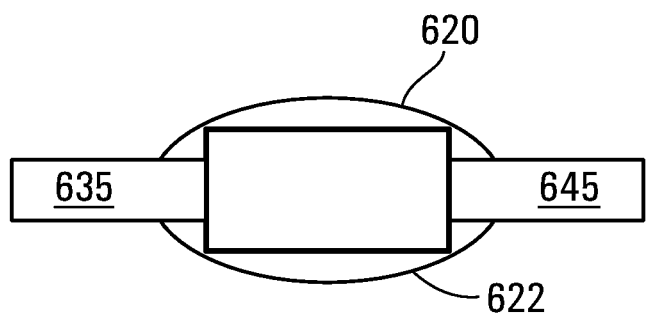
FIG. 6B

METHOD FOR PROVIDING ASSISTED TRAVEL ALONG A COVER PATH IN A VIDEO GAME

CROSS-REFERENCE TO RELATED APPLICATION

This application claims priority to Canadian patent application no. 3,037,722 filed on Mar. 21, 2019, which is incorporated by reference herein in its entirety.

FIELD

The present invention relates generally to video games and, more specifically, to video games that allow playing characters to enter cover mode.

BACKGROUND

Certain video games provide a playing character (PC) with the ability to seek protection in the vicinity of a game object by entering so-called "cover mode". Stated differently, once close enough to the game object, the PC changes its stance to "in cover", such as to appear crouched, for example. Then, having entered into cover mode, all related systems will then be informed of this change in stance and will act accordingly (for example, the locomotion system will change the behavior/animation to use the "in cover" variant when processing the PC). Also, the video game may be designed such that projectiles fired by an enemy towards the PC will appear to be absorbed by the game object without attaining or harming the PC. For instance, when the PC is being shot at, a ray tracing (equivalent to the ammo path from the gun) may be executed from the enemy towards the PC ("line of sight check") in order to validate whether the PC is protected by virtue of being crouched and hidden behind the game object.

To remain in cover mode and thus eligible for protection against, e.g., incoming enemy fire, the PC must travel in a narrow band surrounding the obstacle, known as the "cover path". In previous game designs, the player must precisely control movement of the PC to remain on the cover path; slight deviations of the PC's trajectory could easily cause the PC to leave the cover path, thus exiting "cover mode" and becoming vulnerable to enemy attack. This can of course be problematic and create a non-smooth experience for the player. In other previous game designs, entry into cover mode occurred based simply on vicinity of the PC to a game object, without regard to other factors. This can also be problematic, especially when the PC's proximity to the game object was incidental, such as in transit on the PC's trajectory to another area. The aforementioned inconveniences can interfere with the player's enjoyment of the video game and, ultimately, hinder the game's commercial success.

SUMMARY

According to a first aspect, there is provided a method for implementation by a computer that executed a video game, comprising: obtaining a desired direction of motion of a playing character that is in cover mode and on a cover path; and moving the playing character along the cover path in case the desired direction of motion is within a given range of directions, the playing character being kept in cover mode.

According to another aspect, there is provided a computer-readable storage medium comprising computer-readable instructions which, when read and executed by at least one processor of a gaming device, cause the gaming device to carry out a method in a video game that comprises: obtaining a desired direction of motion of a playing character that is in cover mode and on a cover path; and moving the playing character along the cover path in case the desired direction of motion is within a given range of directions, the playing character being kept in cover mode.

According to another aspect, there is provided a gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises: obtaining a desired direction of motion of a playing character that is in cover mode and on a cover path; and moving the playing character along the cover path in case the desired direction of motion is within a given range of directions, the playing character being kept in cover mode.

According to another aspect, there is provided a method for implementation by a computer that executes game process for a video game, comprising: determining a distance of a playing character to a cover path associated with a particular game object; determining the playing character's angle of approach relative to the game object; and responsive to receipt of a command to invoke cover mode, causing the playing character to enter cover mode in case a plurality of conditions is satisfied including a first condition that depends on the distance of the playing character to the cover path and a second condition that depends on the playing character's angle of approach.

According to another aspect, there is provided a computer-readable storage medium comprising computer-readable instructions which, when read and executed by at least one processor of a gaming device, cause the gaming device to carry out a method in a video game that comprises: determining a distance of a playing character to a cover path associated with a particular game object; determining the playing character's angle of approach relative to the game object; responsive to receipt of a command to invoke cover mode, causing the playing character to enter cover mode in case a plurality of conditions is satisfied including a first condition that depends on the distance of the playing character to the cover path and a second condition that depends on the playing character's angle of approach.

According to another aspect, there is provided a gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises: determining a distance of a playing character to a cover path associated with a particular game object; determining the playing character's angle of approach relative to the game object; responsive to receipt of a command to invoke cover mode, causing the playing character to enter cover mode in case a plurality of conditions is satisfied including a first condition that depends on the distance of the playing character to the cover path and a second condition that depends on the playing character's angle of approach.

According to another aspect, there is provided a method for implementation by a computer that executed a program for creating a video game, comprising: providing a library of game objects including cover paths respectively associated with the game objects; providing a player with an opportunity to select a subset of the game objects; and responsive to receipt of a command to merge the game objects in the subset into a composite game object, creating a composite cover path from the cover paths of the game objects in the subset.

According to another aspect, there is provided a computer-readable storage medium comprising computer-readable instructions which, when read and executed by at least one processor of a gaming device, cause the gaming device to implement a method for a video game creation tool, the method comprising: providing a library of game objects including cover paths respectively associated with the game objects; providing a player with an opportunity to select a subset of the game objects; and responsive to receipt of a command to merge the game objects in the subset into a composite game object, creating a composite cover path from the cover paths of the game objects in the subset.

According to another aspect, there is provided a method for implementation by a computer that executed a video game displayed on a video screen, comprising: obtaining, from a game player, a desired direction of motion of a playing character displayed on the video screen, the playing character being displayed in cover mode and having a position that is on a cover path, the cover path being associated with a game object displayed on the video screen; and keeping the playing character in cover mode and restricting the movement of the playing character under control of the game player by changing a position of the playing character so as to remain on the cover path when the desired direction of motion is within a given range of directions.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

FIG. 5A is a diagram showing two game objects that are separated and with respective cover paths.

FIG. 5B is a diagram showing two game objects that are jointed into a composite game object and that have a composite cover path.

FIG. 6A is a diagram showing a cover path being broken by an obstacle.

FIG. 6B is a diagram showing a cover path being broken by two obstacles.

The accompanying drawings are intended to show example non-limiting embodiments and are not intended to be limitative.

DETAILED DESCRIPTION

Figure 8:
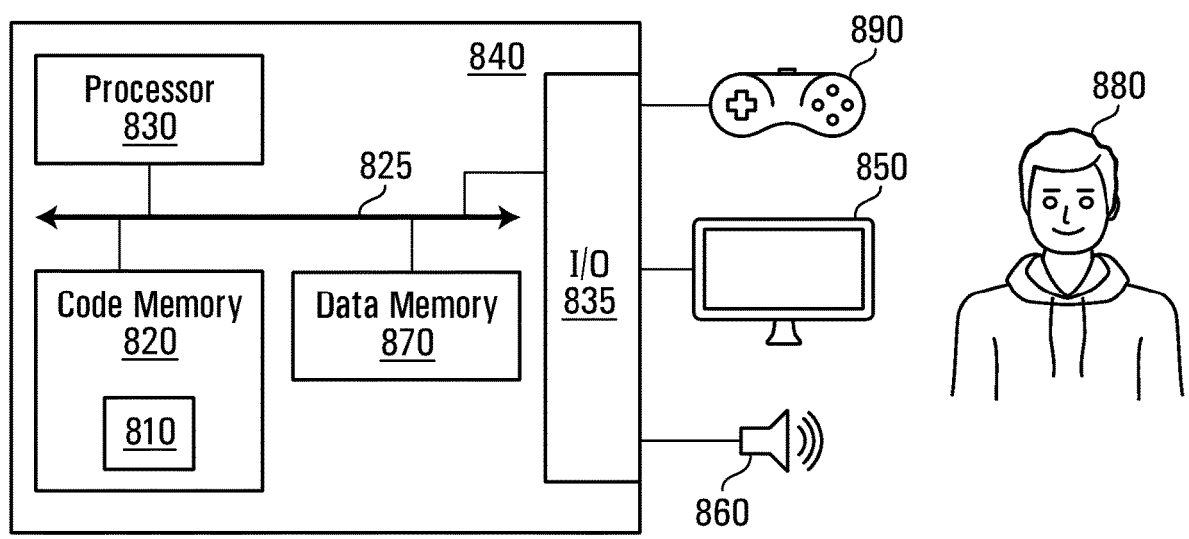
FIG. 8 is a block diagram of a computing device that implements a video game.
Figure 9:
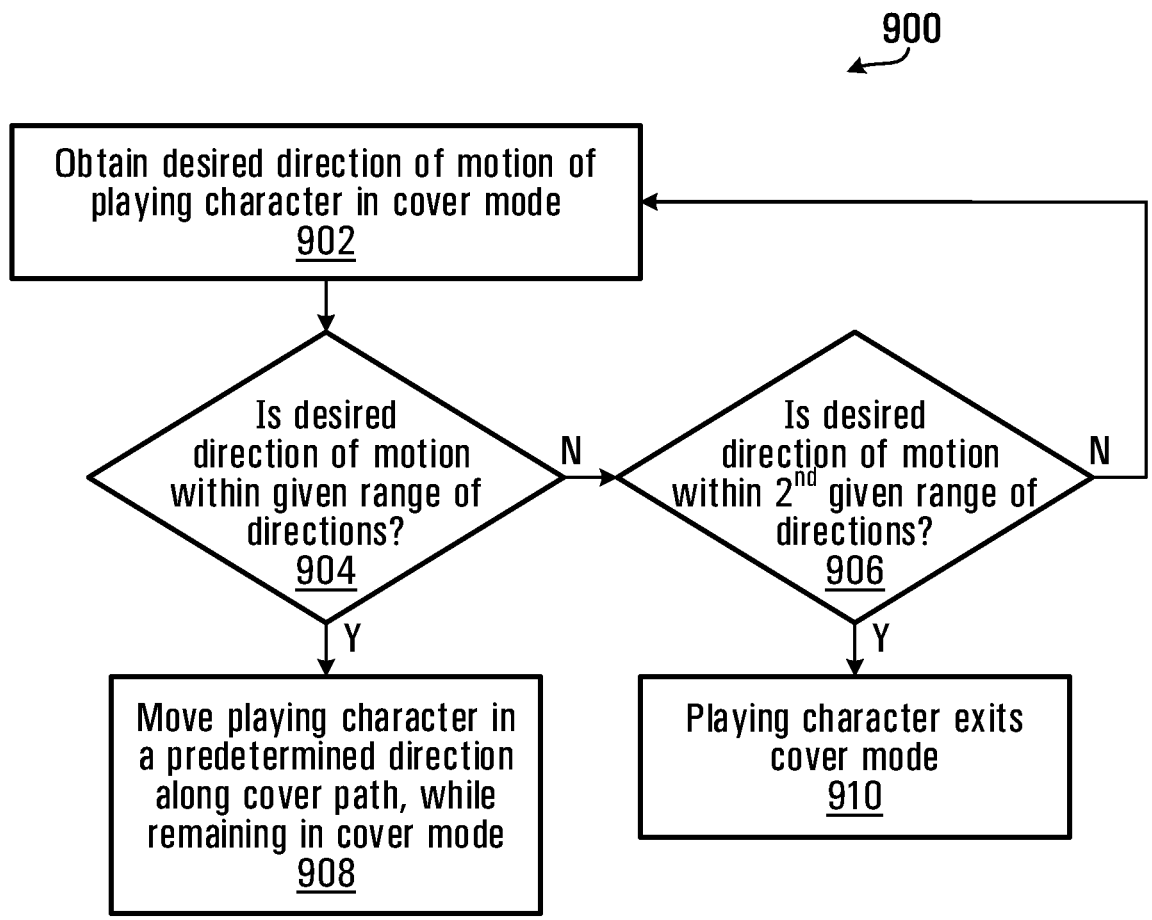
FIG. 9 is a flowchart illustrating steps in navigating along a cover path and conditions for exiting cover mode.
Figure 10:
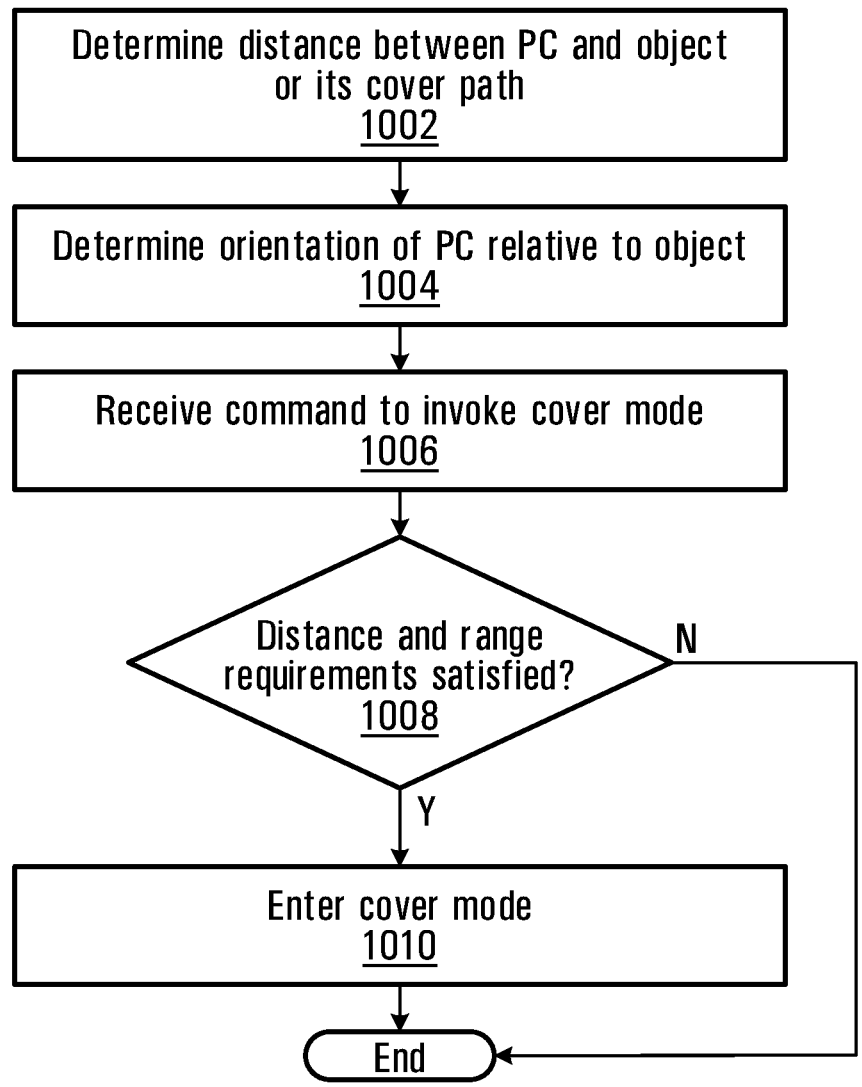
FIG. 10 is a flowchart illustrating steps involved in entering cover mode.

A video game according to certain embodiments of the present invention may solve some of the above problems. With reference to FIG. 8, the video game is, in essence, an interactive computer program defined by computer-readable instructions 810 that are stored in a code memory 820 and read and executed by at least one processor 830. A bus 825 may allow communication between the at least one processor 830 and the code memory 820. The at least one processor 830 may be part of a computing device 840 such as game console, tablet or smartphone. The at least one processor 830 can include at least one central processing unit (CPU) and/or at least one graphics processing unit (GPU).

In a simple non-limiting example embodiment, the interactive computer program defined by the computer-readable instructions 810 includes a game process and a rendering process. The rendering process is a synchronized, real-time processing loop that produces image data that is rendered as images on a video screen 850 and sound data that is reproduced as sounds by a loudspeaker 860. The screen 850 and the loudspeaker 860 may be connected to the at least one processor 830 via an input/output interface (I/O0 835 and the bus 825. The images and sounds represent various game objects having attributes and positions stored in a data memory 870. Examples of game objects include playing characters (PCs) and non-playing characters (NPCs), each with corresponding attributes. The data memory 870 may be connected via the I/O 835 and the bus 825 to the at least one processor 830.

A game player 880 provides inputs via at least one input device 890 (e.g., a joystick, keyboard, controller, microphone, camera and/or gesture sensor, for example). The input device 890 may be connected to the at least one processor 830 via the I/O 835 and the bus 825. As part of executing the game process (sometimes referred to as "game logic"), the inputs received from the player 880 are processed, which causes changes to the attributes and positions of the game objects as stored in the data memory 870. When this changed data is processed by the processing loop of the rendering process (e.g., once every $\frac{1}{30}^{th}$ or $\frac{1}{24}^{th}$ or $\frac{1}{60}^{th}$ of a second), this results in changes to the images being rendered on the screen 850 and to the sounds being produced by the loudspeaker 860. These changes provoke the player 880 into responding by making further inputs, and so on.

It should be appreciated that in some embodiments, the at least one processor 830 may be implemented in a game console, while in other embodiments, the at least one processor 830 may be implemented in a smartphone or other mobile device. In still other embodiments, the game process and the rendering process may be split over multiple processors in multiple devices, including configurations where the multiple devices communicate over the internet. In some cases, a single player plays the video game, whereas in other cases, players may play the same video game. In the case of multiple players, the at least one processor 830 may be a server connected to the multiple players over the internet or the game process may itself be distributed over multiple devices associated with respective players.

One of the attributes of a game object (e.g., a non-playing character such as a boulder or a vehicle) may be a "cover path" associated with the game object and also displayed on the screen 850. As part of the game process, a playing character (PC) that finds itself in proximity to game objects associated with a cover path may have the opportunity to enter into cover mode. The game process thus maintains a record of whether a given PC is in cover mode (e.g., in the data memory 870 as an attribute of the PC) and, if so, to provide the PC with special properties, such as, for example, immunity to attack, a crouching stance, and the ability to travel along the game object's cover path.

Figure 7:
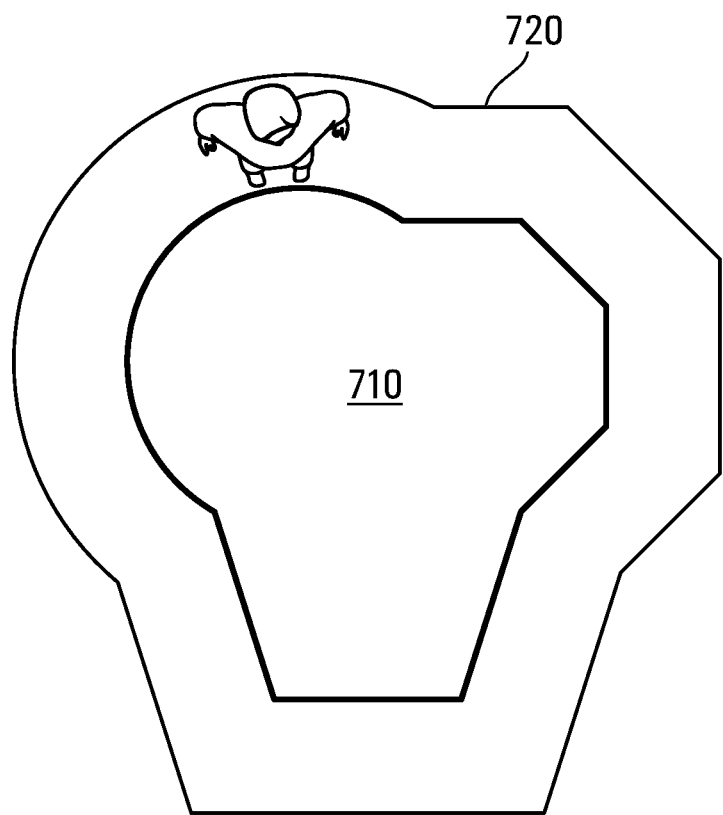
FIG. 7 shows a game object surrounded by an associated cover path.

With reference to FIG. 7, there is shown a game object 710 including an associated cover path 720 in the form of a band circumscribing the game object 710 at a certain distance from the game object 710. For some game objects, the certain distance is predetermined and fixed, while for other game objects it may vary. The location and dimensions of the cover path 720 may be stored in the data memory 870 as an attribute of the game object 710. When the PC 10 is in cover mode and is located on the cover path 720, the PC 10 enjoys reduced visibility to enemies and protection from enemy attacks.

In the following, a description will be provided regarding (i) Entry into cover mode; (ii) Navigation in cover mode; and (iii) Exiting from cover mode.

(i) Entry into Cover Mode

According to certain embodiments, in order for the PC to enter into cover mode, the game process may look for the following specific conditions to be satisfied:

the PC is "sufficiently close" to a particular game object or its associated cover path;

the PC is "facing substantially towards" the particular game object; and the player inputs a predefined command.

A non-limiting example of what is meant by "sufficiently close" to a game object includes the distance (either in pixels or in terms of distance in the 3D virtual world maintained by the game process) between the PC and a point on the game object (e.g., the closest point to the PC) being less than a certain threshold distance. A non-limiting example of what is meant by "sufficiently close" to a game object's cover path includes the distance (either in pixels or in terms of distance in the 3D virtual world maintained by the game process) between the PC and a point on the game object's cover path (e.g., the closest point to the PC) being less than a certain threshold distance. These are of course only examples of what may be meant by the PC being "sufficiently close" to the game object or its associated cover path.

Figure 1:
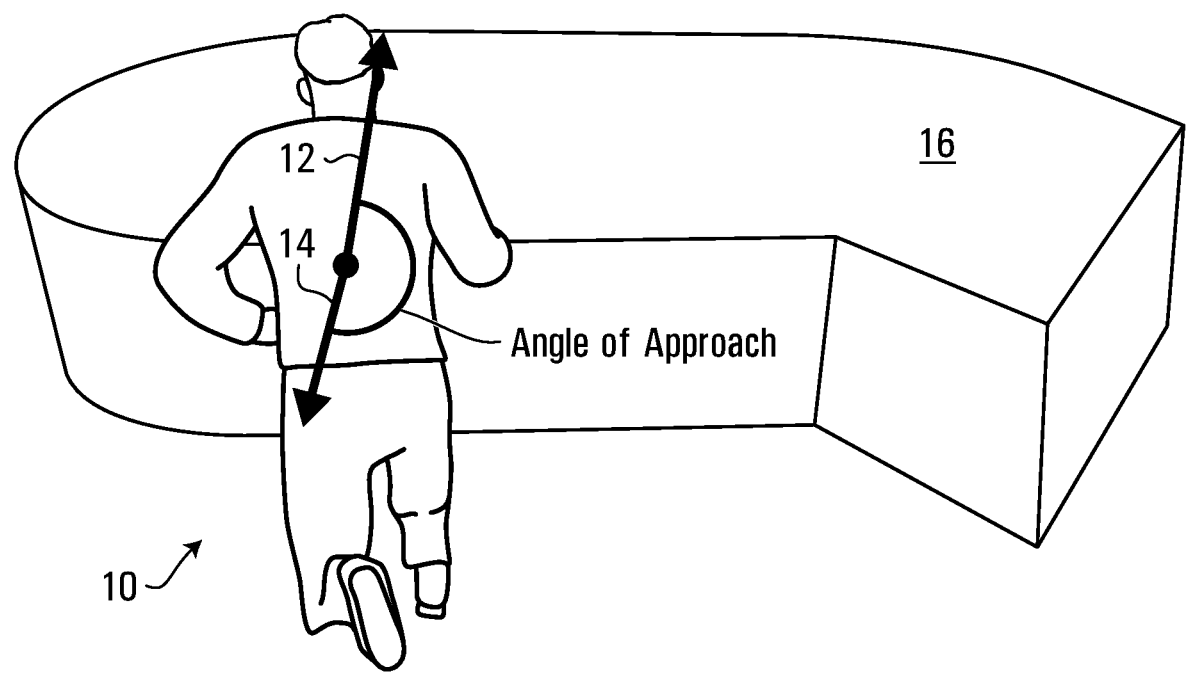
FIG. 1 is a diagram illustrating an angle of approach between a PC and a game object.
Figure 2A:
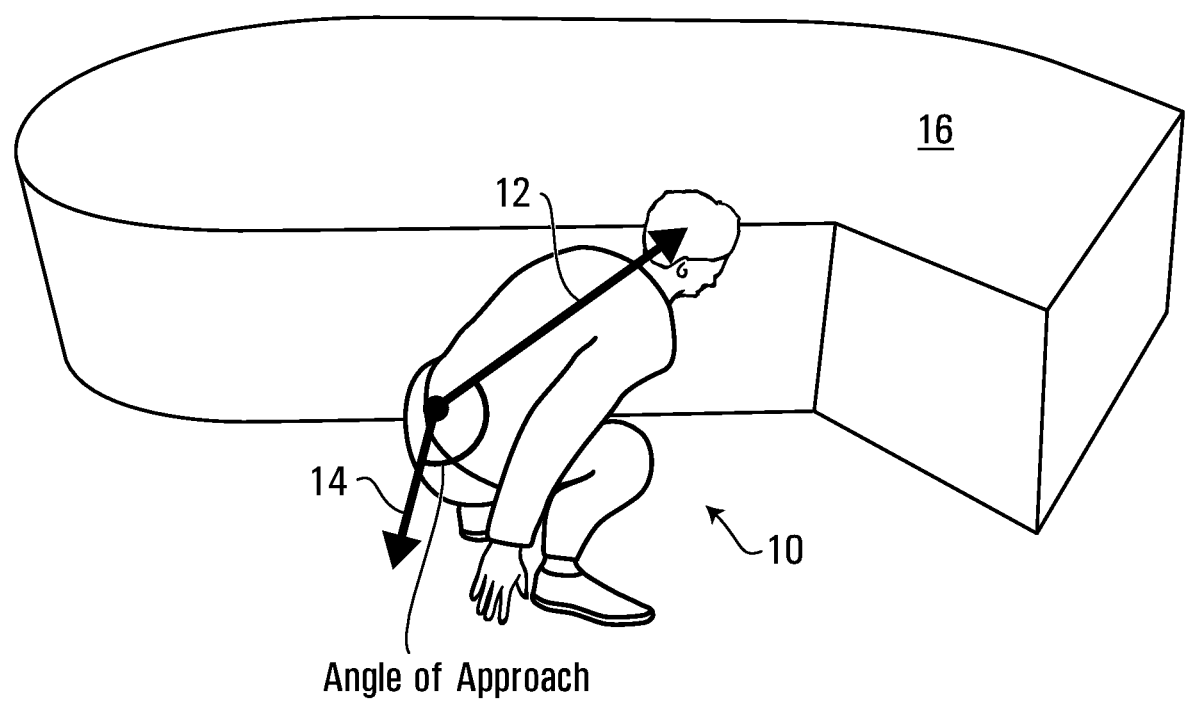
FIG. 2A is another diagram illustrating an angle of approach between a PC and a game object.

One non-limiting example of what is meant by "facing substantially towards" a game object is now provided with reference to FIGS. 1 and 2A. Specifically, the PC 10 may have a bearing 12. Where the PC 10 has a body with a face, the bearing 12 may be defined as a normal to the face (or to the front of the body) of the PC 10. Also, the game object 16 may have a surface normal 14 of its own. The angle between the bearing of the PC 10 and the game object's surface normal 14 may be referred to as the "angle of approach". If the angle of approach is 180 degrees (i.e., head-on) plus or minus a certain tolerance (e.g., a range between 150 and 210 degrees, i.e., 180 degrees+/−30 degrees), then the PC 10 may be considered to be facing substantially towards the game object 16. This is of course only one example of defining what may be meant by the PC "facing substantially towards" the game object.

It should be noted that in some video games, the player may have independent control of the bearing of the PC and of the desired direction of the motion of the PC. In other words, the PC can be facing in one direction but moving in another (e.g., facing frontwards while moving backwards or sideways). In other games, the player may only input the desired direction of motion of the PC and the game process will automatically orient the body/face of the PC to face this direction, thus the player does not have independent control of the bearing of the PC and of the desired direction of motion of the PC.

One non-limiting example of a predefined command that could trigger entry into cover mode in combination with the other conditions described above could be a command to change the stance of the PC, for example, to instruct the PC to crouch. This command may be inputted by the player 880 pressing a joystick in a certain direction or pushing a certain button (of the input device 890) with a certain amount of force for a certain duration. Another non-limiting example of a predefined command that could trigger entry into cover mode includes a button or keystroke or voice command that is specifically associated to cover mode entry.

Additionally, entry into cover mode may be conditional upon a combination of both proximity and angle of approach, i.e., at greater distances, entry into cover mode may require a more head-on angle of approach (closer to 180 degrees), whereas at smaller distances to the game object, entry into cover mode may be more permissive (less of a head-on angle of approach, i.e., within a greater range on either side of 180 degrees).

Thus, as can be appreciated from the above, entry into cover mode is not merely based on proximity of the PC to the game object having a cover path (or to the cover path itself). Rather, it is based on other factors as well.

(ii) Navigation in Cover Mode

In accordance with an embodiment, the game process is configured to keep the playing character in cover mode and to restrict the movement of the playing character under control of the game player. Specifically, for example, at each point along the cover path 720 around the game object 710, continued travel along the cover path involves movement along a limited set (typically two) predetermined, sometimes opposite, directions at that point. As such, movement of the PC 10 along the cover path 720 does not necessarily involve getting closer to or further from the game object 710; rather, at any given point along the cover path 720, remaining on the cover path 720 means traveling in one of a limited number of directions.

As such, once the above conditions are satisfied and the PC has entered cover mode, consider that the player 880 provides an input indicative of a desired displacement of the PC, and in a desired direction of motion. This input can be provided by, e.g., a joystick, game controller, keyboard, mouse or other input device, and may involve pushing a certain button with a certain force for a certain duration. In accordance with certain embodiments, the game process causes the PC to move along the game object's cover path in an "assisted" manner (while remaining in cover mode).

One non-limiting example of what is meant by "assisted" movement along the cover path includes the game process transforming player inputs into movements of the PC in one of the predefined directions associated with the cover path at that point, even if the desired direction of motion does not precisely correspond to one of the predefined directions. For example, when the desired direction of motion is "generally aligned" with one of the predefined directions, the game process may transform the player input into movement of the PC along the cover path in that predefined direction.

For example, consider that the PC on the cover path is constrained to move in either a direction X or a direction Y along the cover path. Assisted movement along the cover path implies that the desired direction of motion need not be precisely direction X or precisely direction Y. Rather, the desired direction of movement need only have a certain minimum component towards direction X in order for the PC to move in direction X along the cover path, or a certain minimum component towards direction Y in order for the PC to move in the direction Y along the cover path.

Figure 2B:
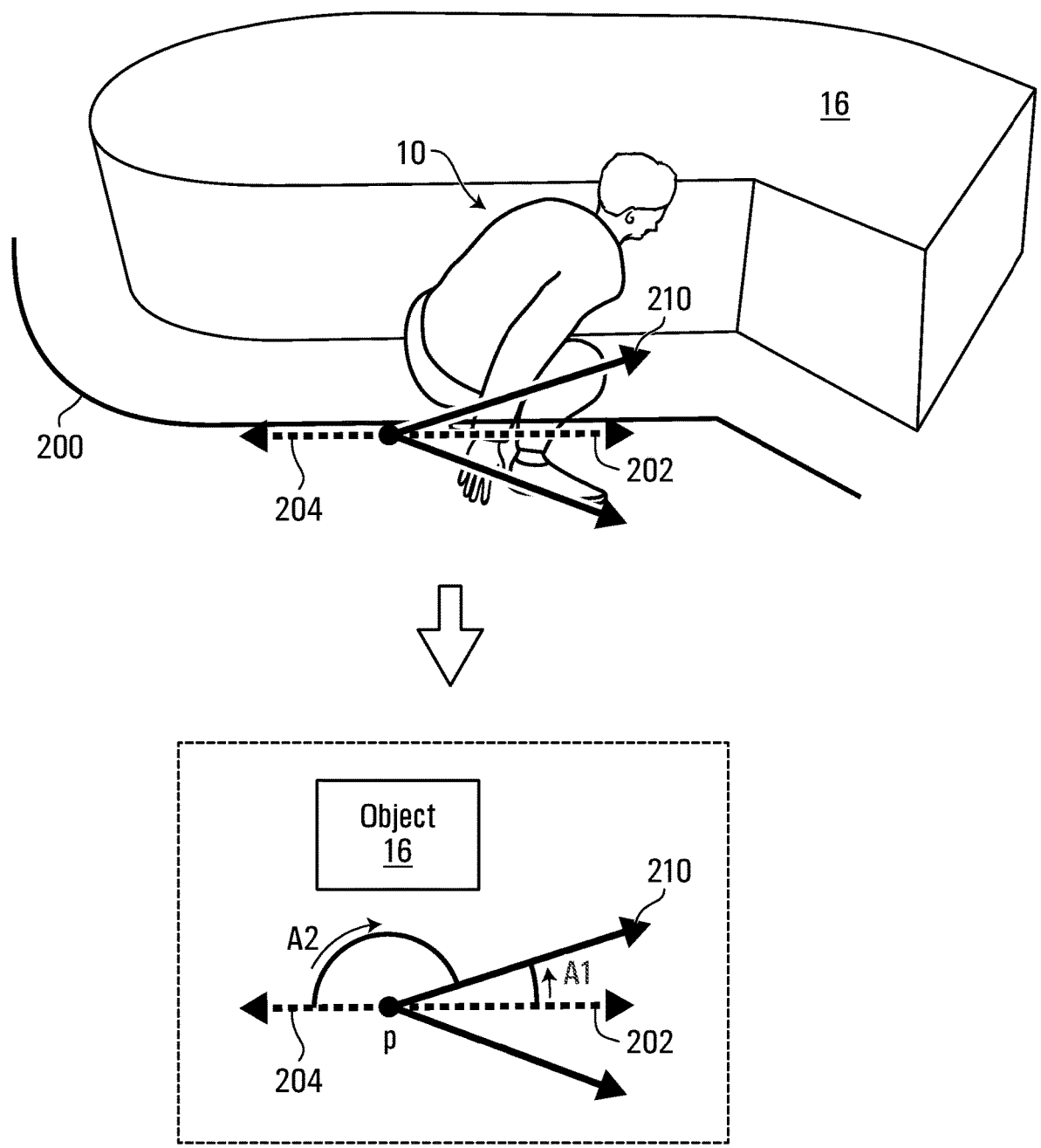
FIG. 2B is a diagram illustrating an angle between a desired direction of motion and a cover path direction.

One non-limiting example of what is meant by "generally aligned" is now provided with reference to FIG. 2B. Here the PC is shown at a point P along the cover path 200 from which it is possible to move in a first direction 202 or in a second direction 204. The angle between the first direction 202 and the desired direction of motion 210 of the PC 10 (as input by the player 880) is obtained and referred to as a first angle A1. The angle between the second direction 204 and the desired direction of motion 210 is obtained and referred to as a second angle A2. Then, for instance, if the first angle A1 is within a certain range (e.g., between −45 and 90 degrees), then the game process moves the PC 10 along the cover path 200 in the first direction 202. Similarly, if the second angle is within a certain range (e.g., between −45 and 90 degrees degrees), then the game process moves the PC 10 along the cover path 200 in the second direction 204.

Thus, it can be said that the PC 10 is moved in the first direction 202 along the cover path when the desired direction of motion is "generally aligned" with the first direction 202, and the PC 10 is moved in the second direction 204 along the cover path when the desired direction of motion is "generally aligned" with the second direction 204. This could mean that the PC 10 is moved in the first direction 202 when the desired direction of motion 210 is within a first range of directions (those directions that form a corresponding range of first angles A1 with the first direction 202). Similarly, the PC is moved in the second direction 204 when the desired direction of motion 210 is within a second range of directions (those directions that form a corresponding range of second angles A2 with the second direction 204). The given ranges of directions could each span a maximum angular distance, such as 150 degrees, 135 degrees, 120 degrees or 90 degrees, for example. This would leave a certain angular "blind" range where, if the user were to input a desired direction of motion in this angular blind range, there would be no movement of the PC along the cover path at all. For example, should the desired direction of motion 210 have a significant component of movement of the PC 10 away from the game object 16 (e.g., A1 or A2 between −90 and −45 degrees), the game process might be programmed to prevent movement of the PC 10 along the cover path 210 under such circumstances (and could even cause the PC to exit cover mode).

In some cases, the amount of displacement or speed of movement of the PC in the first or second direction along cover path may be related to how much alignment there is between the desired direction of motion and the first or second direction, respectively. For example, the amount of displacement or speed of movement in the first direction 202 could be related (e.g., proportional) to the absolute value of the sine of the angle between the desired direction of motion and the first direction 202, or to the projection of the desired direction of motion onto the first direction 202.

In other cases, the amount of displacement or speed of movement of the PC in the first or second direction along cover path is dependent only on the desired displacement (i.e., the magnitude of the input), with no dependency on the desired direction of motion.

(iii) Exiting from Cover Mode

In an embodiment, the game process provides assisted travel along the cover path associated with a game object, so long as the player does not cause the PC to exit cover mode. Exiting cover mode may occur in various circumstances.

For example, if the angle between desired direction of motion of the PC and both the first and second directions is outside the aforementioned ranges (or, equivalently, is in yet a third range), the game process may cause the PC to exit cover mode and to move in the actual direction of the desired direction of motion, as input by the player.

Alternatively or in addition, there may be a condition that depends on the angle of approach, i.e., the angle between the game object's surface and the face or body of the PC. In this case, if the angle of approach is detected by the game process to be outside a particular range, this may also cause the PC to exit cover mode without necessarily requiring the player 880 to input a desired displacement.

In a variant, further variables may affect whether the PC enters or exits cover mode. These variables may depend on the speed of movement of the PC. For example, it is envisaged that as long as the PC is moving (or moving at a certain speed), the required angle of approach in order to enter cover mode may need to fall within a narrower range (e.g., between 170 and 190 degrees), i.e., the PC needs to be moving towards the game object and facing the game object quite squarely in order to enter cover mode. This may prevent casual and unintended entry into cover mode while the PC is in action. However, if the PC is in "idle" and close enough to the game object associated with a cover path, the game process may be more permissive (for instance, the range of angles of approach that would cause entry into cover mode could be wider, i.e., between 135 and 225 degrees) to allow for a smoother experience.

In still further variants, entry into cover mode and exit out of cover mode may occur under non-complementary conditions, i.e., the behavior may be hysteretic. For example, entry into cover mode may require an angle of approach of 180 degrees+/−X, whereas exiting from cover mode may require an angle of approach of 180 degrees+/−Y (Y not equal to X), in addition to other requirements on the angle between the desired direction of motion and the first (and second) direction and whether the PC is in motion or not. As such, the game process may cause the PC to exit cover mode in case the desired direction of motion is within a range of directions that is narrower, or wider, or the same width, as the range of directions to which the desired direction of motion should belong in order to enter cover mode.

There may also be a requirement that the PC already be in so-called "combat mode" in order to then enter cover mode. Combat mode is a set of features such as animations (body stances), skills, sounds, etc. when the PC is prepared to fight enemies. The PC is said to be in combat mode when at least one enemy is "aware" of the PC's presence (for example, by "seeing" the PC). If required, level designers might also force entry into combat mode by script. The PC enters and exits combat mode based on these conditions. If combat mode is exited while the PC is in cover mode, cover mode immediately ceases and the PC stands up (i.e., ceases to crouch).

Figure 3A:
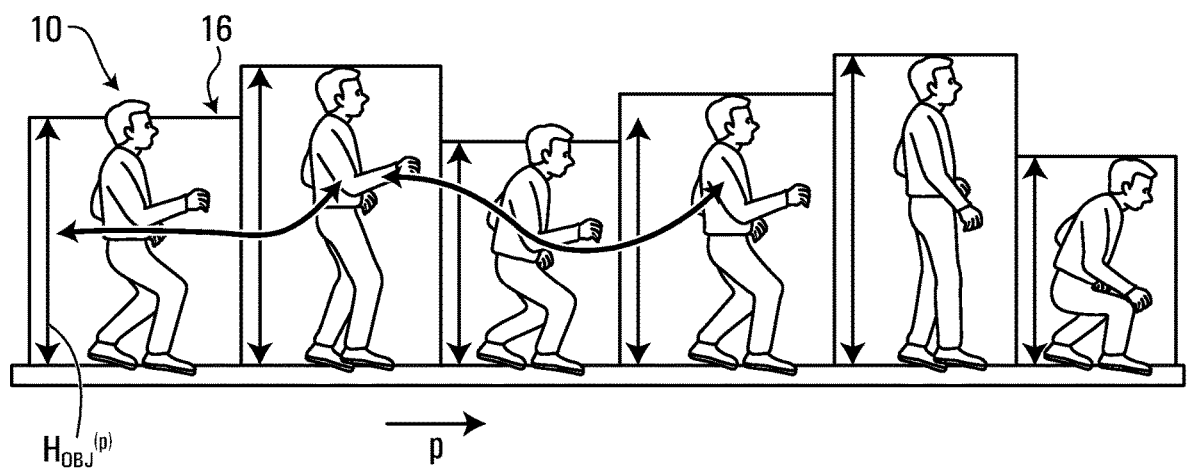
FIGS. 3A and 3B are diagrams illustrating navigation of a PC along a cover path of a game object having a variable height.
Figure 3B:
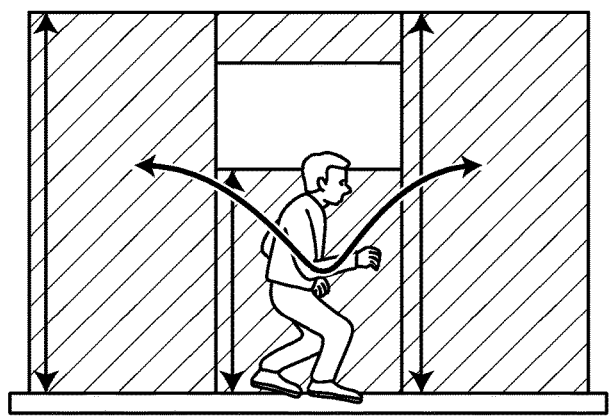

Certain characteristics of the PC (such as its height when crouched) may change as the PC travels around the game object in cover mode. Specifically, consider that the game object in question may have an uneven height that varies along the cover path (see FIGS. 3A and 3B). At some point p along the cover path, the continuous height of the game object from the ground (denoted $H_{OBJ}(p)$) may be less than the full height of the PC (denoted $HF_{PC}$) but greater than the height of the PC in a maximally crouched position (denoted $HC_{PC}$). As such, at some points along the cover path, the PC may need to crouch significantly in order to avoid detection, whereas at other points along the cover path, the PC could crouch somewhat less and still not risk detection. The game process may apply the necessary amount of crouching as part of the PC being in cover mode, thereby changing the height of the PC as a function of position along the cover path. This may be done autonomously, i.e., without specific user input requesting the change in height of the PC. The actual amount of applied crouching is dynamically controlled by the game process so that, for any point p along the cover path, the height of the PC (denoted $H_{PC}(p)$) is between $H_{OBJ}(p)$ and $HC_{PC}$. For example, for a realistic effect, the game process may be configured such that $H_{PC}(p) = \max\{\min\{H_{OBJ}(p), HF_{PC}\}, HC_{PC}\}$. This corresponds to the minimum amount of crouching to avoid detection.

Those skilled in the art should appreciate that it is possible that some game objects in the virtual world are associated with a cover path and that other game objects are not. In some embodiments, a game object must obey size restrictions (e.g., minimum size restrictions) in order for there to be a cover path associated with the game object. For example, the game object may be required to have a continuous height from the ground of at least 1.00 m at each point around its perimeter, and may be required to have a minimum length of 3.00 m and a minimum width of 2.00 m. For its part, the cover path (i.e., the path around the game object along which the PC moves when in cover mode) may include a perimeter/border that is set back from the game object by a distance of 1.00 m. Of course, these are simply example measurements and are not intended to be limiting.

Cover Authoring System

Figure 4:
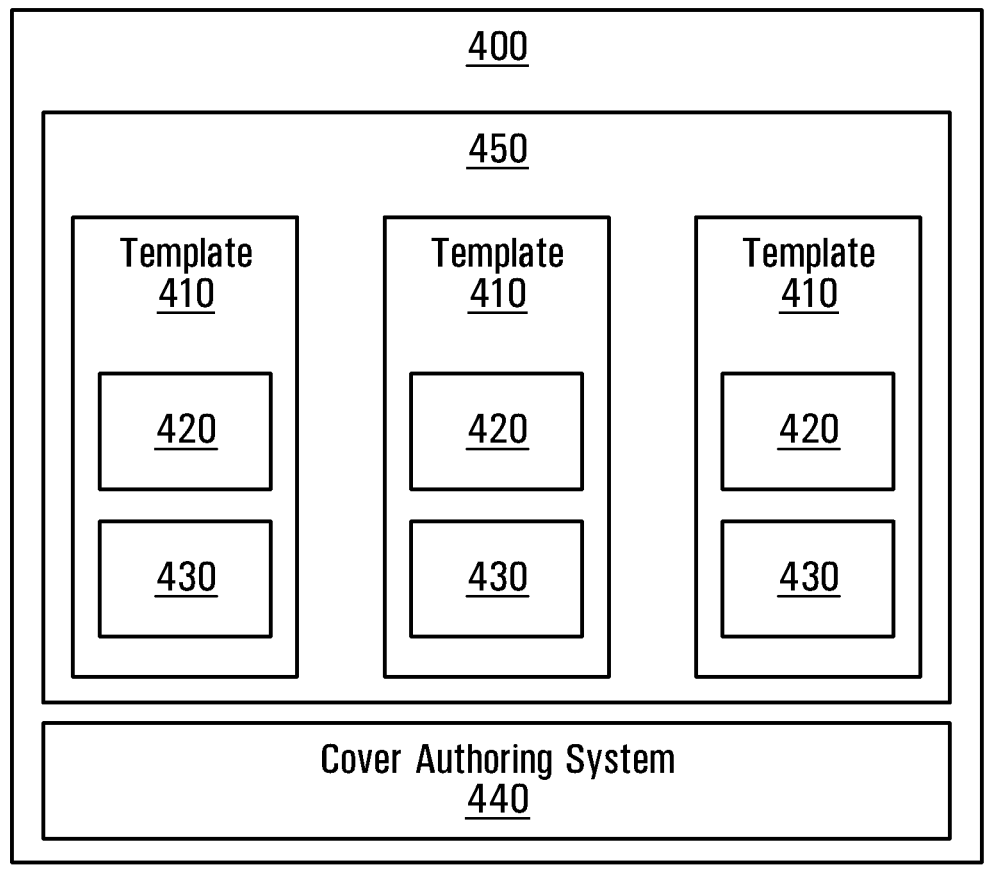
FIG. 4 is a block diagram of a memory that stores computer-readable instructions pertaining to a cover authoring system and a plurality of templates for use therewith.

In some embodiments, the cover path associated with a game object having a particular shape may be created offline during initial game design, e.g., during an authoring phase using a cover authoring system. To this end, and with reference to FIG. 4, a library 450 of game object templates 410 is provided in a memory 400. Each game object template 410 comprises game object parameters 420 and associated cover path parameters 430. The memory 400 also comprises computer-readable instructions 440 which, when implemented by a processor, cause the processor to implement the cover authoring system. During initial game design, the level designer using the cover authoring system accesses the library 450 and selects a set of game object templates 410 and places them relative to one another in a desired configuration. The cover authoring system may be implemented by the at least one processor 830 that eventually runs the game process and the rendering process, or by a console or computer which is not necessarily the at least one processor 830 that eventually runs the game process and the rendering process.

In some configurations, for example as conceptually shown in FIG. 5A, which shows two game objects 510A, 510B, the game objects are placed far enough from each other (e.g., in terms of distance in the virtual world) to not be combined by the cover authoring system. As such, each game object 510A, 510B remains distinctly visible to the PC and retains its cover path 520A, 520B. There will remain two distinct cover paths that the PC may travel along, depending on which game object the PC happens to be next to when in cover mode.

Another configuration is shown in FIG. 5B, which also conceptually shows two game objects 510A, 510B, but where the cover authoring system will automatically detect that the game objects are close enough to each other (e.g., within a certain threshold distance or number of pixels) and in response will merge the game objects to create a composite game object. Moreover, the cover authoring system merges the cover paths to produce a composite (and more complex) cover path 520C for the composite game object. As described earlier in this document, when the PC is close to either game object making up the composite game object, the desired direction of movement will be transformed into movement of the PC along the composite cover path in one direction or the other.

It should be understood that during the authoring phase, the cover authoring system may look for all the currently loaded game objects (i.e., those appearing in the level being designed) and may analyze them in order to determine whether any two or more should be combined into a single composite game object with a single composite cover path. For this, a series of proximity and validation checks are performed by the cover authoring system and certain game objects might be combined in order to create a more complex cover path. It is noted that as a result of this merging operation, the total perimeter of the composite cover path may also be less than the sum of the perimeters of the cover paths of the various selected game objects that make up the composite game object.

In still other embodiments, cover paths can be created by the player invoking the cover authoring system during gameplay. For example, the player may identify one or more game objects around which the player would like to create a cover path. The player may then issue a command to "freeze" the selected game objects. The interactive computer program may respond by coating the selected game objects with a layer of ice, for example. This may also invoke the cover authoring system which will attempt to create a cover path around the aforementioned game objects. Accordingly, the cover authoring system validates whether the set of selected game objects allows formation of a cover path. This can involve validation against minimum size requirements as well as joining proximate game object "islands" into a single composite game object, and merging the associated cover paths into a single composite cover path.

The cover authoring system may also be configured to identify collisions in a given cover path (i.e., where the underlying game object comes into proximity with a wall or other game object that does not have a cover path associated with it). Upon detection of such a collision, the cover authoring system may be configured to break the cover path or to split the cover path into more than one cover path. For example, in FIG. 6A, the cover path 610 is broken due to collision with a game object 615 (e.g., a wall) and in FIG. 6B, the cover path is split in two parts 620, 622 to due a collision with two game objects 635, 645 (e.g., a wall and a vehicle).

In some embodiments, the dimensionality of the cover path associated with a game object can be modified during gameplay. For example, a portion of a game object may be fully or partly destroyed through enemy fire. This can have an impact on the associated cover path. In fact, destruction of part of the game object can leave behind a residual game object that no longer meets the minimum dimensionality requirements to support a valid cover path around its perimeter. Such an enemy attack could make the entire cover path disappear, leaving behind a shrunken game object with no cover path surrounding it. As such, the memory would no longer indicate an association between the game object and any cover path.

In some embodiments, properties of the cover path in addition to dimensionality may be modified during gameplay. For example, the cover path associated with a given game object may have an attribute whereby it has a protective layer to resist destruction. As such, in the absence of a protective layer, the game process may be designed such that enemy fire directed at the PC, although it would not inflict damage on the PC, would nevertheless destroy the cover path (and it is the next round of enemy fire that would be damaging to the PC). However, with a protective layer over the cover path, the game process may be designed such that enemy fire directed at the PC would not destroy the cover path at first, although it would weaken it to the point where a second round of enemy fire would destroy it as mentioned above. It should be appreciated that multiple such protective layers may be applied, so as to provide extra strength to the cover path.

A flag in memory may indicate whether a cover path is protected by a protective layer and, if so, how many such protective layers protect the cover path.

Those of ordinary skill in the art will appreciate that the above provides a description of certain non-limiting embodiments and that numerous variants and additions are possible without departing from the scope of the invention, which is defined by the claims appended hereto.

What is claimed is:

1. A method for implementation by a computer that executes a video game, comprising:
   obtaining a desired direction of motion of a playing character that (i) is in a cover mode and (ii) has a position that is on a cover path, the cover path being associated with a game object, the cover path at least partially surrounding the game object; and
   in case the desired direction of motion corresponds with a direction along the cover path, changing a position of the playing character so as to remain on the cover path, the playing character being kept in the cover mode, wherein changing the position of the playing character comprises moving the playing character along an actual direction of motion along the cover path which corresponds with the desired direction of motion; and
   in case the desired direction of motion does not correspond with a direction along the cover path, changing a position of the playing character so as to remain on the cover path in case the desired direction of motion is within a given range of directions, the playing character being kept in the cover mode, wherein changing the position of the playing character comprises moving the playing character along an actual direction of motion along the cover path which does not correspond with the desired direction of motion.

2. The method defined in claim 1, wherein the actual direction of motion is a predetermined direction, wherein the given range of directions spans a predetermined maximum angular distance which is selected to designate directions that are generally aligned with the predetermined direction.

3. The method defined in claim 1, wherein the playing character is located at a point on the cover path, and wherein the actual direction of motion is one of a plurality of predetermined directions associated with the point on the cover path.

4. The method defined in claim 1, wherein the given range of directions includes directions that form a corresponding range of angles with a normal to the cover path.

5. The method defined in claim 1, wherein obtaining the desired direction of motion comprises processing input obtained from a player of the video game.

6. The method defined in claim 1, further comprising:
   obtaining a bearing of the playing character; and
   causing the playing character to exit cover mode in case (i) the desired direction of motion is within a second range of directions; and (ii) the bearing of the playing character is within a particular range of bearings.

7. The method defined in claim 1, further comprising:
   obtaining the playing character's angle of approach relative to the game object; and
   causing the playing character to exit cover mode in case (i) the desired direction of motion is within a second range of directions; and (ii) the angle of approach of the playing character is within a particular range of angles.

8. The method defined in claim 7, wherein obtaining the playing character's angle of approach comprises obtaining a bearing of the playing character, obtaining a normal to the game object and computing an angle between the bearing and the normal to the game object.

9. The method defined in claim 1, further comprising:
   causing the playing character to exit cover mode in case the desired direction of motion is within a second range of directions.

10. The method defined in claim 9, wherein the second range of directions is complementary to the given range of directions.

11. The method defined in claim 9, wherein the given range of directions is narrower than the second range of directions.

12. The method defined in claim 9, wherein the second range of directions is narrower than the given range of directions.

13. The method defined in claim 1, wherein the game object has a variable height, the method comprising varying a height of the playing character as the playing character travels along the cover path as a function of the height of the game object.

14. The method defined in claim 13, wherein varying a height of the playing character as the playing character is carried out without user input requesting the change in height of the playing character.

15. The method defined in claim 1, wherein the given range of directions includes a plurality of directions other than directions along the cover path.

16. A method for implementation by a computer that executes a video game displayed on a video screen, comprising:
   obtaining, from a game player, a desired direction of motion of a playing character displayed on the video screen, the playing character being displayed in a cover mode and having a position that is on a cover path, the cover path being associated with a game object displayed on the video screen, the cover path at least partially surrounding the game object; and
   in case the desired direction of motion corresponds with a direction along the cover path, keeping the playing character in the cover mode and restricting the movement of the playing character under control of the game player by changing a position of the playing character so as to remain on the cover path, wherein changing the position of the playing character comprises moving the playing character along an actual direction of motion along the cover path which corresponds with the desired direction of motion in case the desired direction of motion does not correspond with a direction along the cover path, keeping the playing character in the cover mode and restricting the movement of the playing character under control of the game player by changing a position of the playing character so as to remain on the cover path when the desired direction of motion is within a given range of directions, wherein changing the position of the playing character comprises moving the playing character along an actual direction of motion along the cover path which does not correspond with the desired direction of motion.

17. The method defined in claim 16, wherein the actual direction of motion is a predetermined direction, wherein the given range of directions spans a predetermined maximum angular distance which is selected to designate directions that are generally aligned with the predetermined direction.

18. The method defined in claim 16, wherein the playing character is located at a point on the cover path, and wherein the actual direction of motion is one of a plurality of predetermined directions associated with the point on the cover path.

19. The method defined in claim 16, wherein the given range of directions includes directions that form a corresponding range of angles with a normal to the cover path.

20. The method defined in claim 16, wherein obtaining the desired direction of motion comprises processing input obtained from a player of the video game.

21. The method defined in any one of claim 16, further comprising:
obtaining a bearing of the playing character; and
causing the playing character to exit cover mode when the desired direction of motion is determined to be within a second range of directions and the bearing of the playing character is determined to be within a particular range of bearings.

22. The method defined in claim 16, further comprising:
obtaining the playing character's angle of approach relative to the game object; and
causing the playing character to exit cover mode when the desired direction of motion is determined to be within a second range of directions and the angle of approach of the playing character is determined to be within a particular range of angles.

23. The method defined in claim 22, wherein obtaining the playing character's angle of approach comprises obtaining a bearing of the playing character, obtaining a normal to the game object and computing an angle between the bearing and the normal to the game object.

24. The method defined in claim 16, further comprising:
causing the playing character to exit cover mode in case the desired direction of motion is determined to be within a second range of directions.

25. The method defined in claim 24, wherein the second range of directions is complementary to the given range of directions.

26. The method defined in claim 24, wherein the given range of directions is narrower than the second range of directions.

27. The method defined in claim 24, wherein the second range of directions is narrower than the given range of directions.

28. The method defined in claim 16, wherein the game object has a variable height, the method comprising varying a height of the playing character as the playing character travels along the cover path as a function of the height of the game object.

29. The method defined in claim 28, wherein varying a height of the playing character as the playing character is carried out without user input requesting the change in height of the playing character.

30. The method defined in claim 16, wherein the given range of directions includes a plurality of directions other than directions along the cover path.

* * * * *